United States Patent [19]

Enning et al.

[11] Patent Number: 5,332,277
[45] Date of Patent: Jul. 26, 1994

[54] BEARER JOINT FOR VEHICLE BODYWORK

[75] Inventors: Norbert Enning, Denkendorf; Ulrich Klages, Lenting; Heinrich Timm, Ingolstadt, all of Fed. Rep. of Germany

[73] Assignee: Audi A.G., Ingolstadt, Fed. Rep. of Germany

[21] Appl. No.: 75,564

[22] Filed: Jun. 14, 1993

[30] Foreign Application Priority Data

Dec. 20, 1990 [DE] Fed. Rep. of Germany ....... 4040981

[51] Int. Cl.$^5$ ............................................. B62D 25/00
[52] U.S. Cl. ..................................... 296/29; 296/185; 296/192; 296/194; 296/202
[58] Field of Search .................. 296/29, 185, 187, 194, 296/192, 202; 280/785

[56] References Cited

U.S. PATENT DOCUMENTS

| | | | |
|---|---|---|---|
| 2,520,074 | 8/1950 | Werning et al. | 296/28 |
| 4,618,163 | 10/1986 | Hasler et al. | 280/785 |
| 5,052,742 | 10/1991 | Akoshima et al. | 296/192 |
| 5,094,504 | 3/1992 | Wurl | 296/185 |
| 5,102,164 | 4/1992 | Fujinaka et al. | 280/788 |

FOREIGN PATENT DOCUMENTS

| | | |
|---|---|---|
| 0146716 | 12/1988 | European Pat. Off. ..... B62D 23/00 |
| 894508 | 10/1953 | Fed. Rep. of Germany. |
| 2358356 | 11/1973 | Fed. Rep. of Germany ......... B62D 23/00 |
| 3918283 | 5/1990 | Fed. Rep. of Germany ......... B62D 25/00 |
| 6137583 | 7/1986 | Japan ............................ B62D 25/08 |
| 1204868 | 8/1989 | Japan ............................ B62D 25/04 |
| 2200580 | 10/1990 | Japan ............................ B62D 25/08 |

*Primary Examiner*—Robert R. Song
*Attorney, Agent, or Firm*—Jacques M. Dulin

[57] ABSTRACT

An improved bearer joint in a vehicle bodywork consisting of extruded light metal bearer members connected together by cast metal joining elements. According to the invention, an end portion of at least one bearer member is received within a concave region of at least one joining element and is connected thereto at two connection points on either side of the coverage region so that the portion of the bearer member between the connection points and overlying the concave region acts as a tension member or steadying strut depending on the direction of the load. In a preferred embodiment, the improved bearer joint is the node connector type joining element located at the middle of the A post where the downwardly and obliquely oriented forward roof post joins the substantially vertically upright forward door post. The invention provides a rigid connection with high expansion and energy absorption capabilities, thereby strengthening an otherwise critical weak point in the vehicle roof structure.

15 Claims, 1 Drawing Sheet

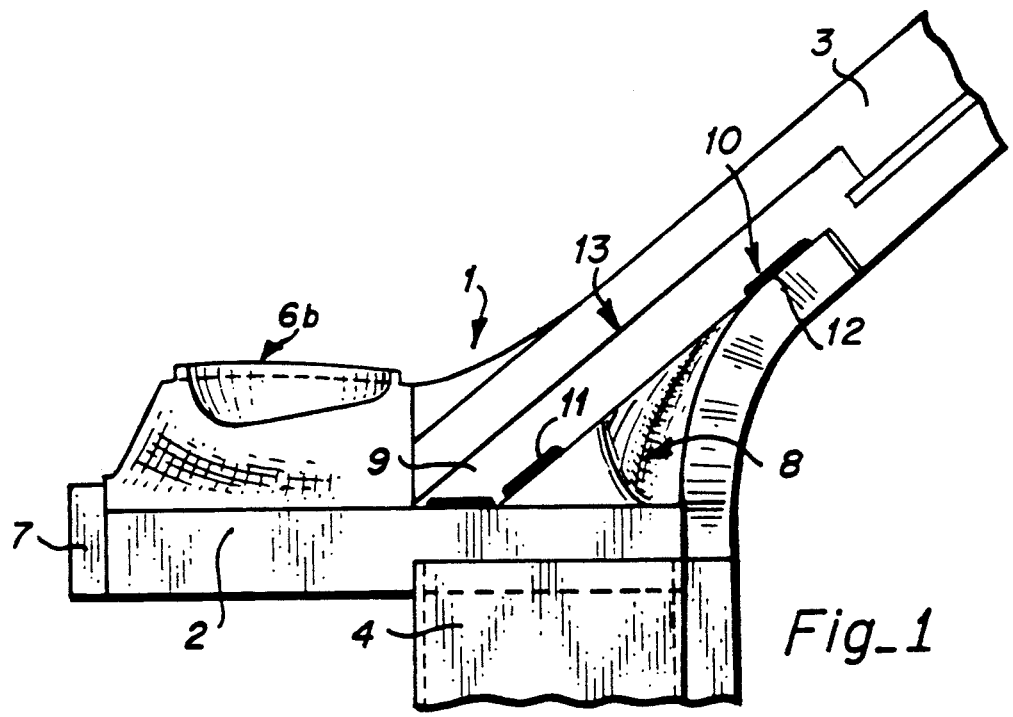
Fig_1
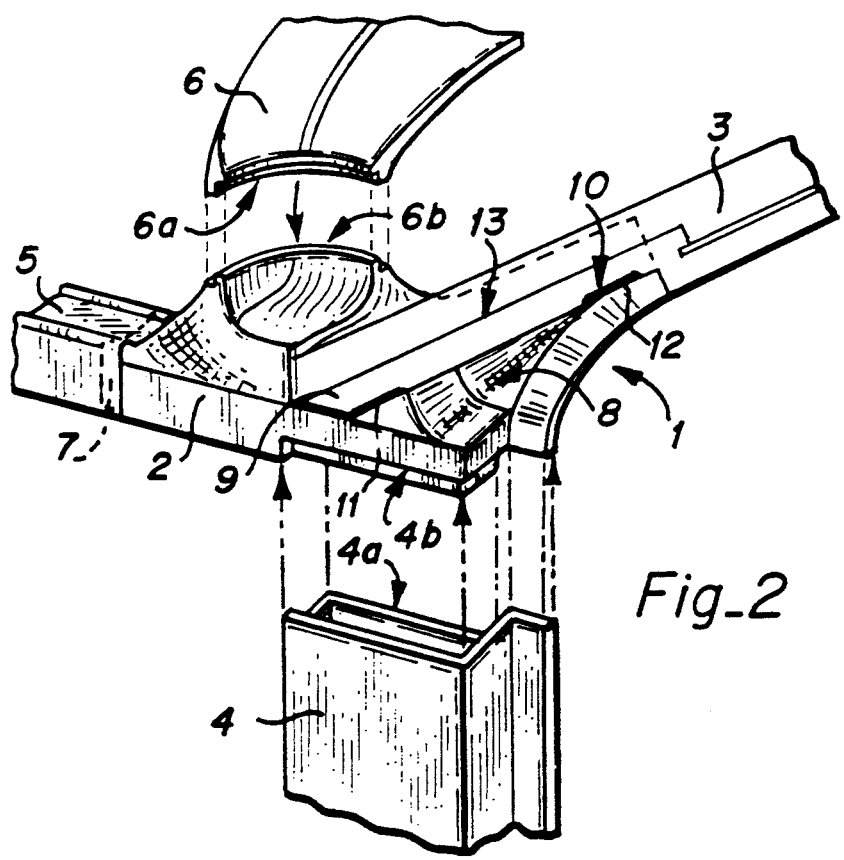
Fig_2

BEARER JOINT FOR VEHICLE BODYWORK

FIELD

The invention relates generally to improvements in vehicle bodywork construction and more particularly to a bearer joint in a vehicle bodywork constructed of light metal bearer members and cast metal joining elements.

BACKGROUND

European patent document EP-PS 0 146 716 teaches how to construct the supporting structure of a vehicle body by using joining elements or "node connectors" to join the ends of a plurality of hollow-section extruded aluminum bearer members. The node connectors are formed as light metal castings. Depending upon the location of a particular bearer joint within the bodywork, the associated node connector may be provided with a specially molded and/or notched support surface for receiving an adjoining end portion of one or more extruded aluminum bearer members. Also, the note connector may consist of two half shell portions, which when combined, form a shell enclosure adapted to receivingly engage the end portions of two or more adjoining bearer members. In both cases, the joined ends of the bearer members are held in place by a weld and/or adhesive connection.

The greatest strain in a vehicle bodywork typically occurs at the bearer joints where several bearer members are joined together by a single node connector. Accordingly, high demands are placed on the strength and rigidity of these connection points. An especially critical connection point in the vehicle bodywork is the bearer joint located at the middle of the A post, Where a single node connector joins four frame components including the substantially vertically oriented lower A post portion (forward door post), a forwardly disposed and longitudinally directed front fender bearer (fender support brace), a lower transverse front windshield stringer, and an obliquely upward directed upper A post portion (forward roof post). Here, in particular, it is not possible to dimension the forward roof post with any given thickness in cross section, since to do so would impair the driver's vision. Thus, the node connection with the bottom end of the forward roof post represents the critical weak point of the roof and, consequently, the vehicle body as a whole in the roof imprint or vehicle rollover test.

A bearer connection between the forward roof post and the front section of a vehicle body is known, for example, from U.S. Pat. No. 2,520,074. In this document, the lower forward end portion of the forward roof post is downwardly directed through the region of the lower transverse window stringer and into the front section of the vehicle body. Once inside the vehicle body, it widens into a plate-shape member and is outwardly flanged along its side edges. The flanged side edges overlay an outside shroud panel and are connected thereto by spot welding. The entire arrangement in front of the forward roof post comprises relatively large surface area sheet metal components which overlay and connect onto one another. This document does not teach or suggest a self-supporting vehicle bodywork wherein individual frame pieces or bearer members are connected together by specific and separate joining elements or node connectors. Accordingly, this document does not address the problems associated with ensuring a stable bearer connection to a spatially separated joining element, and in particular a stable connection between an extruded aluminum bearer member and a cast aluminum node connector.

Japanese patent document JP-A-2 200 580 discloses another example of a bearer connection located at a middle region of the A post whereby the adjacent ends of three hollow section bearers (the forward door post, the forward roof post and the front fender bearer) are joined without using an additional joining element. In this design, the upper end of the forward door post is butt-connected to a longitudinally oriented and forwardly disposed fender bearer. A bottom end portion of a tubular front roof post is received within an appropriately sized cylindrical bore hole extending through both the walls of the fender bearer and the upper end of the forward door post and is welded in place along mutually supporting surfaces. A drawback with such a design, however, is that close tolerances for the machined parts are required to ensure a stable and accurately aligned connection, especially during the welding procedure. Close tolerances are sometimes difficult to control during the manufacturing process.

THE INVENTION

Objects

It is therefore an object of the invention to provide an improved bearer joint connection between a bearer member and a joining element in a vehicle bodywork which overcomes the problems of the prior art, and in particular, a node connection between forward door post and the forward roof post which is capable of withstanding heavy strain and also facilitates quick and accurate assembly.

Other and further objects and advantages will no doubt become apparent from the following detailed written descriptions, drawings and appended claims.

DRAWINGS

FIG. 1 is a side view in schematic representation of a bearer joint of the present invention showing a joining element or node connector located at the middle region of an A post of a vehicle body.

FIG. 2 is a downward looking exploded perspective view of the bearer joint of FIG. 1 as seen from a position above and behind the bearer joint.

SUMMARY

The invention concerns an improved bearer joint in a vehicle bodywork of the type which includes at least one joining element for connecting the ends of a plurality of frame bearer members. According to the invention, the joining element contains a concave surface region on which an end portion of at least one adjoining bearer member is supported. Since this concave surface region represents a fracture-vulnerable region, the invention proposes a unique connection scheme whereby the adjoining bearer member is secured to the concave surface region at two spaced connection points thereby leaving an unsecured middle portion of the bearer member (i.e., that portion disposed between the two connection points) which overlays the concave fracture-vulnerable region of the joining element.

This provides a broad base for the proposed connection and creates a rigid bracing between the joining element and the adjoining end of the bearer member. The unsecured portion of the bearer member overlaying the concave fracture-vulnerable region of the joining element acts like an additional steadying strut or a tension member, depending on the direction of load. The solid, broad-based connection of two locations in combination with the "tension member" action provides a substantial increase in strength and load-supporting capacity for the bearer joint.

Generally, the concave region of the joining element is configured as a lengthwise trough and receives the adjoining end segment of the bearer member at a projected angle. In the preferred embodiment of the invention, one side end of the trough-like concave region is connected to a terminal end portion of the adjoining bearer member, while the second spaced side end of the trough-like concave region is connected to the bearer member at a distance inward from its terminal end portion.

The bearer connection of the invention is advantageously implemented in an aluminum bodywork wherein the bearer members are formed as extruded aluminum hollow sections and the joining elements are formed as cast aluminum node connector pieces. The framework produced by the very rigid bracing of thick-walled cast aluminum pieces and extruded aluminum sections is capable of large expansion and energy absorption.

The connections at either side end of the trough-like concave region can be produced in the familiar manner with high strength by welding. However, other known connection techniques may also be used including but not limited to screw fasteners and glue adhesives. In the case of glue adhesives, it is necessary to have sufficiently large and flat contact surfaces to ensure a strong bond.

The bearer connector of the invention is especially advantageous for use as the joining element or node connector located at the middle of the A post. At this bearer joint location, the node connector joins four different frame components including the forward door post (i.e., the lower portion of the A post), the obliquely oriented forward roof post (i.e., the upper portion of the A post), the fender support brace and the transverse stringer which forms the lower frame boundary of the front windshield. The forward roof post is also preferably fashioned as an extruded section and it is the lower forward end of this bearer member which is connected to the concave region of the joining element in accordance with the invention.

Thus, this bearer member covers an upper concave region of the joining element and is connected to the latter at both its bottom-most terminal end and at a point located at a spaced distance away from the bottom-most terminal end. The unsecured region of the forward roof post lying between these two connection points thus again acts as a tension member and/or steadying strut and covers a fracture-vulnerable region of the joining element. In this way, an especially stiff and rigid bracing arrangement for tying the forward roof post to the joining element is achieved and results in a substantial stiffening of a heretofore critically weak point in the vehicle roof. Accordingly, the entire passenger compartment is designed more safely.

In accordance with a further aspect of the invention, an upper closure plate is provided to enclose the adjoining portion of the forward roof post contained within the concave region of the joining element. This closure plate can be used in the area of the joint to receive a windshield.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 is a side view schematic representation of a bearer joint located at the middle of an A post of a vehicle body showing the connection between a joining element or node connector 2 and a bearer member 3. The A post comprises a first obliquely and upwardly directed bearer member 3 which corresponds to the forward roof post (i.e., that post which forms a frame boundary between the front windshield and a forward side window pane) and a second substantially vertically oriented lower bearer member 4 which corresponds to a forward door post on which a front door (not shown) is hinged.

As is best seen from the exploded perspective view of a specific arrangement in FIG. 2, the joining element 2 also joins bearer members 5 and 6 which correspond to the front fender support brace and the transverse lower windshield stringer, respectively.

The bearer member or front fender support brace 5 is mounted on a projection 7 of the joining element 2 and is connected thereto by a weld. The bearer member or forward door 4 post and the bearer member or transverse lower windshield stringer 6 are each provided with notched ends 4a and 6a, respectively, which are received within corresponding supporting surfaces 4b and 6b, respectively, of the joining element 2 in the known way. Here again a firm connection is provided by welding or alternatively by gluing or by use of screw fasteners.

In the preferred embodiment, the bearer member or forward roof post 3 is relatively narrow in cross-section in order to reduce the blind spot in driver's forward field of vision. The lower end segment of the forward roof post 3 is received within a concave, fracture-vulnerable region 8 of the joining element 2. The forward roof post 3 is connected at its lower terminal end 9 and at a point 11 located a distance away from the terminal end 9 to corresponding underlying support surfaces of the concave region 8 at points 11 and 12, respectively. Again, the method of connection may include welding, gluing or even use of screw fasteners.

The free or unconnected region 13 which spans the fracture-vulnerable region 8 between connection points 11 and 12 acts like a tension member or steadying strut, depending on the direction of load. This achieves an especially rigid tying of the bearer member 3 to the joining element 2 and the danger of fracture at this otherwise very critical weak spot of a vehicle's roof is considerably reduced.

For the final assembly, it is preferred to cover the joining element 2 and the lower region of the bearer 3 by a closure plate 14 which preferably has a smoothly continuous outer contour. Such a closure plate 14 is shown schematically in FIG. 1. The closure plate 14 preferably also forms a mount for a windshield in the region of the joint.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. In a vehicle bodywork of the type which includes a bearing structure having a plurality of bearer members connected by joining elements, an improved bearer joint comprising in operative combination:
   a) at least one joining element having at least one surface with a medial concave region, said concave region having opposed end portions;
   b) at least one elongated bearer member having an end segment disposed spanning said concave region of said joining element; and
   c) means for connecting said end segment of said elongated bearer member to each of said opposed end portions of said concave region, and said portion of said elongated bearer member is unconnected to said concave region to act as a tension member when an applied load on said elongated bearer member is in tension and as a steadying strut for the bearer joint when an applied load is in compression.

2. An improved bearer joint as in claim 1 wherein a terminal end region of said end segment of said elongated bearer member is connected to one of said opposed end portions of said concave region.

3. An improved bearer joint as in claim 1 wherein:
   a) said bearer member comprises a hollow-bodied extruded aluminum section; and
   b) said joining element comprises a cast aluminum piece.

4. An improved bearer joint as in claim 1 wherein said connection means is selected from the group of metal connections consisting essentially of a thermal weld connection, a screw fastener connection, an adhesive bond connection, and combinations thereof.

5. An improved bearer joint as in claim 1 wherein:
   a) said joining element is the joining element located at a midportion of an A post which defines a juncture between a vertically oriented forward door post and an obliquely oriented forward roof post;
   b) said bearer member is said forward roof post; and
   c) said joining element further connects adjoining ends of a fender support brace and a transverse lower windshield stringer.

6. An improved bearer joint as in claim 5 which includes a closure plate for enclosing said lengthwise end segment of said bearer member within said concave region and said closure plate includes means for mounting a windshield.

7. An improved bearer joint as in claim 2 wherein:
   a) said bearer member comprises a hollow-bodied extruded aluminum section; and
   b) said joining element comprises a cast aluminum piece.

8. An improved bearer joint as in claim 2 wherein said connection means is selected from the group of metal connections consisting essentially of a thermal weld connection, a screw fastener connection, an adhesive bond connection, and combinations thereof.

9. An improved bearer joint as in claim 2 wherein:
   a) said joining element is the joining element located at a midportion of an A post which defines a juncture between a vertically oriented forward door post and an obliquely oriented forward roof post;
   b) said bearer member is said forward roof post; and
   c) said joining element further connects adjoining ends of a fender support brace and a transverse lower windshield stringer.

10. An improved bearer joint as in claim 9 which includes a closure plate for enclosing said lengthwise end segment of said bearer member within said concave region and said closure plate includes means for mounting a windshield.

11. An improved bearer joint as in claim 3 wherein said connection means is selected from the group of metal connections consisting essentially of a thermal weld connection, a screw fastener connection, an adhesive bond connection, and combinations thereof.

12. An improved bearer joint as in claim 3 wherein:
   a) said joining element is the joining element located at a midportion of an A post which defines a juncture between a vertically oriented forward door post and an obliquely oriented forward roof post;
   b) said bearer member is said forward roof post; and
   c) said joining element further connects adjoining ends of a fender support brace and a transverse lower windshield stringer.

13. An improved bearer joint as in claim 12 which includes a closure plate for enclosing said lengthwise end segment of said bearer member within said concave region and said closure plate includes means for mounting a windshield.

14. An improved bearer joint as in claim 4 wherein:
   a) said joining element is the joining element located at a midportion of an A post which defines a juncture between a vertically oriented forward door post and an obliquely oriented forward roof post;
   b) said bearer member is said forward roof post; and
   c) said joining element further connects adjoining ends of a fender support brace and a transverse lower windshield stringer.

15. An improved bearer joint as in claim 14 which includes a closure plate for enclosing said lengthwise end segment of said bearer member within said concave region and said closure plate includes means for mounting a windshield.

* * * * *